United States Patent [19]

Steffens

[11] Patent Number: 4,770,353
[45] Date of Patent: Sep. 13, 1988

[54] ARRANGEMENT FOR BALANCING BLADE ASSEMBLIES

[75] Inventor: Gustav W. Steffens, Remscheid, Fed. Rep. of Germany

[73] Assignee: G. Walter Steffens GmbH & Co., Remscheid, Fed. Rep. of Germany

[21] Appl. No.: 100,671

[22] Filed: Sep. 24, 1987

[30] Foreign Application Priority Data

Sep. 26, 1986 [DE] Fed. Rep. of Germany ....... 3632605

[51] Int. Cl.⁴ .............................................. B02C 18/16
[52] U.S. Cl. ................................... 241/282.2; 241/292
[58] Field of Search .................. 241/292, 292.1, 282.1, 241/282.2; 73/480, 65, 470; 83/591, 663, 654, 655, 664, 665, 699

[56] References Cited

U.S. PATENT DOCUMENTS

| | | | |
|---|---|---|---|
| 3,141,485 | 7/1964 | Bonner et al. | 241/292 X |
| 4,049,202 | 9/1977 | Schmidt | 241/292 X |
| 4,145,009 | 3/1979 | Fukui | 241/292 X |
| 4,170,903 | 10/1979 | Wanke | 73/480 |
| 4,294,415 | 10/1981 | Wetter et al. | 241/292 |

Primary Examiner—Mark Rosenbaum
Attorney, Agent, or Firm—Bromberg, Sunstein & Casselman

[57] ABSTRACT

An arrangement is provided to balance rotatable cutter blade assemblies of the type including cutting blades and disks mounting onto a drive shaft. At least one balancing element is provided at the circumference of at least one disk, the balancing element being movable and fixable along the circumference of the at least one disk, the balancing element displaying a functional shape, such as that used for cutting, mixing, conveying and/or emulsifying.

7 Claims, 2 Drawing Sheets ered by the head nut 6, which covers the end of the

ARRANGEMENT FOR BALANCING BLADE ASSEMBLIES

BACKGROUND OF THE INVENTION

1. Field of the Invention

The invention relates generally to devices for balancing blade assemblies, and in particular to devices for balancing cutter blade assemblies.

2. Description of Related Art

One arrangement for balancing blade assemblies is disclosed in West German Patent No. DE-OS 27 39 740, corresponding to U.S. Pat. No. 4,170,903, for an invention of Wanke. There, individual blades are provided with balancing elements consisting of rings with an eccentric mass distribution. The rings can be rotated into balancing position, and can be fixed in this position by restraining screws. This arrangment suffers from the disadvantage that the axial length of the cutter blade assembly becomes relatively large, due to the rings.

SUMMARY OF THE INVENTION

The present invention provides a balancing arrangement that increases the work capacity of a blade assembly, while retaining its axial length. This is accomplished by utilizing a balancing element that is also a functional element for cutting, mixing, conveying, and/or emulsifying. Here, the balancing element is designed in accordance with the shapes of cutter blades. These can include rectangles, triangles, or rhombuses. The balancing elements can also have typical tooth shapes, such as saw-tooth shapes.

The present device has the advantage that the blade assembly can easily be balanced in the required manner, while at the same time balancing elements mounted onto drive disks contribute towards processing the material, without any need for increasing the axial length of the blade assembly by providing extraneous elements. For example, the present device can influence the direction of material flow both in the cutter bowl and in the cutting space of the cutter cover. Furthermore, the temperature of the material being processed can also be regulated with the aid of this device.

To facilitate a simple fixing and moving of the balancing element(s) on the respective disk, the disk has a dovetail profile on its circumference, into which the balancing element can be inserted. In this embodiment, a dovetail groove can be formed in the circumferential surface of the disk. A dovetail profile of the balancing element engages this groove. It is also possible to provide an annular projection with a dovetail profile on the circumferential surface, which engages a dovetail groove in the balancing element.

BRIEF DESCRIPTION OF THE DRAWINGS

The embodiments of the invention are set forth in greater detail in the accompanying drawings, in which.

DESCRIPTION OF SPECIFIC EMBODIMENTS

Figure 1:
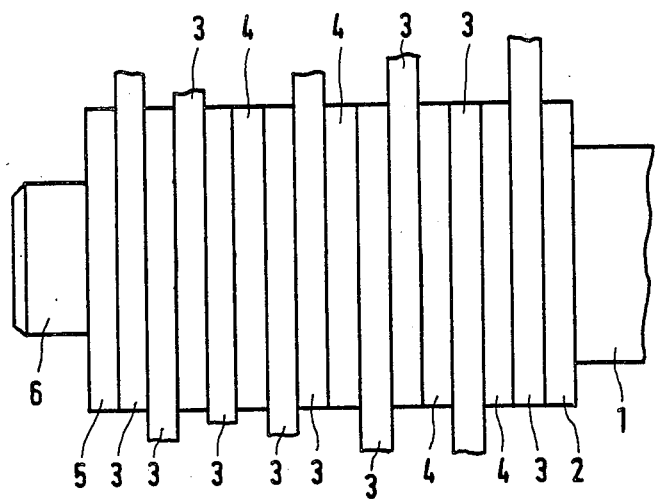
FIG. 1 is a side view of a cutter blade assembly.
Figure 2:
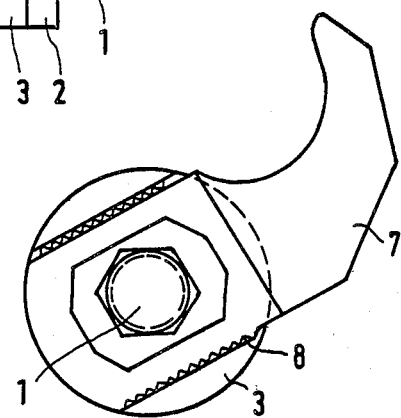
FIG. 2 is a front view of a cutter blade inserted into a drive disk.

The cutter blade assembly shown in FIG. 1 has a driven cam shaft 1, along which the following elements are disposed sequentially: a first end disk 2, several drive disks 3 with spacer disks 4 in between, a second end disk 5, and a head nut 6, which covers the end of the cam shaft 1. A cutter blade 7, shown in FIG. 2 is inserted into each drive disk 3. The blade is held in position by teeth 8 along the cutter blade. The teeth engage corresponding recesses on the drive disk 3. The individual cutter blades 7 in the cutter blade arrangement can be mutually displaced around the axis of rotation of the arrangement. Thus, two successive blades can make an angle of, for example, 60, 90, 120, or 180 degrees.

Figure 3:
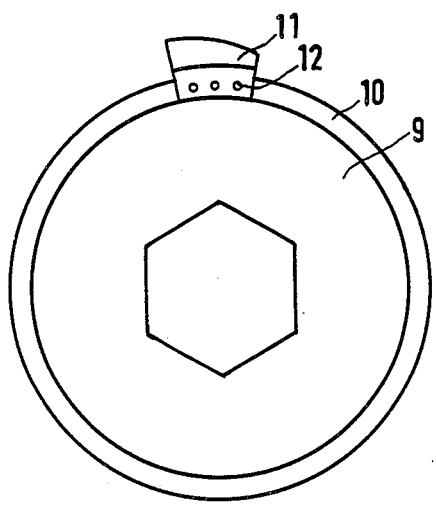
FIG. 3 shows a front view of a first embodiment of a drive disk with a balancing element.
Figure 4A:
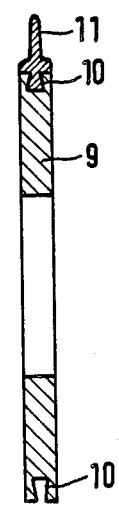
FIGS. 4a and 4b each show a drive disk with a balancing element in axial section.
Figure 4B:
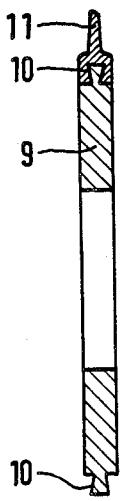

The end disks 2 and 5, drive disks 3, and spacer disks 4 can be designed as balancing disks either individually or all in conjunction. Such a balancing disk 9 (FIG. 3) has a surrounding dovetail profile 10 at its circumference. The dovetail profile can be designed so as to lie interior to the circumferential surface of the balancing disk 9, as shown in FIG. 4a, i.e., by a groove in the circumferential surface, or so as to lie exterior to the surface, as shown in FIG. 4b. The balancing elements 11 are pushed onto the balancing disk 9. At the side to be affixed onto the balancing disk 9, the balancing elements have a profile corresponding to the dovetail profile 10. The balancing elements 11 form the actual balancing weights to eliminate the existing imbalances. The dovetail profile 10 has a recess at one point on the circumference of the balancing disk 9 to receive the balancing element. The dovetail profile acts as a guide for moving the balancing element.

The balancing process itself is effected by moving the balancing elements 11 at the circumference of the balancing disks 9 and by fixing the balancing elements 11 at the suitable point, e.g., by means of the screws 12. As a rule, two or more balancing elements are needed per balancing disk.

The balancing elements 11 have a height such that they extend somewhat beyond the disk diameter. This protrusion can range, for example, between 5 mm and about 200 mm. The weight of the balancing elements can differ. Depending on need, it can range, for example, between 5 g and 1 kg. However, balancing elements of different shape can also have the same weight.

Figure 5A:
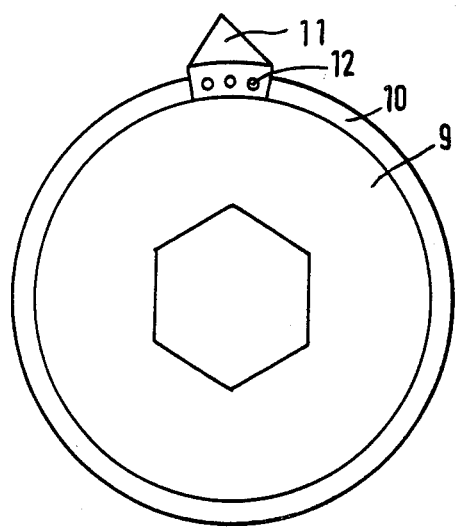
FIGS. 5a through 5d show front views of drive disks with four further embodiments of balancing elements.
Figure 5B:
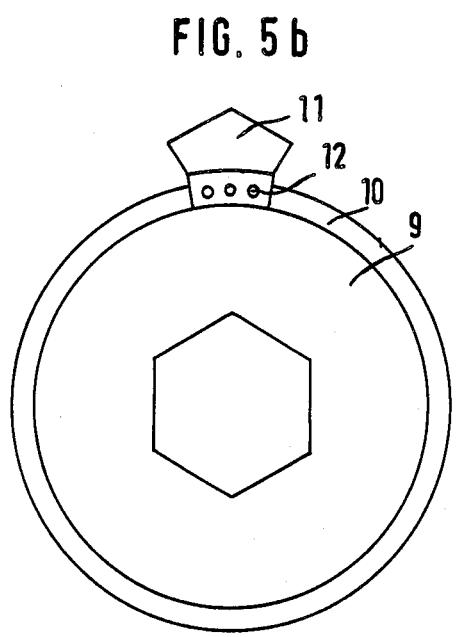
Figure 5C:
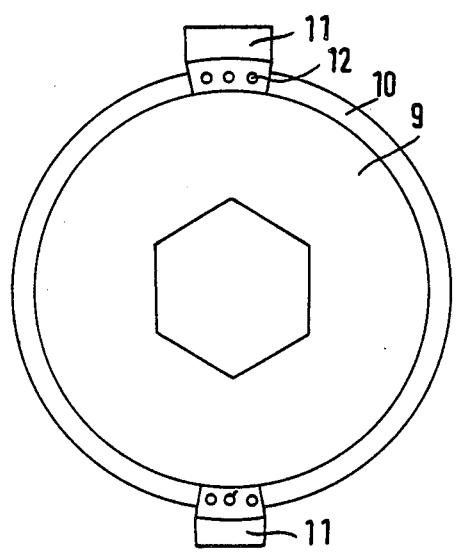
Figure 5D:
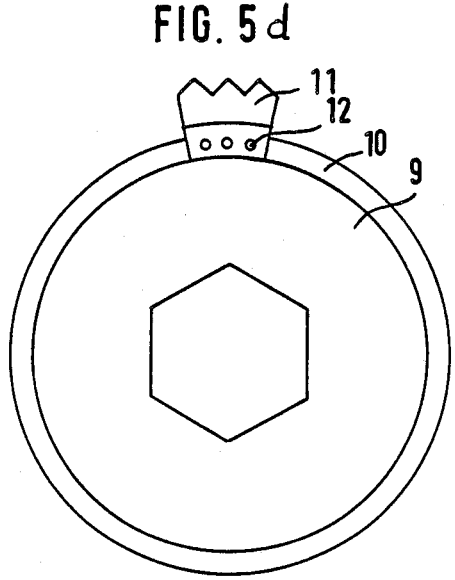

In the embodiment shown in FIG. 5a, the balancing element 11 has the shape of a triangle, in FIG. 5b, it has the shape of a rhombus, in FIG. 5c, it has the shape of a rectangle, and in FIG. 5d, it has the shape of sawtooth edge. Here, the ground section is directed towards the desired effect, i.e., emulsifying, cutting, mixing, and/or conveying the cut material. The cutting can here be provided on one side, i.e., to the right or to the left, or on both sides, as well as centered or off-center. In the embodiment shown in FIG. 5c, there are two balancing elements 11.

What is claimed is:

1. An improved cutter blade assembly of the type including cutting blades and disks mounted on a rotatable drive shaft, wherein the improvement comprises:
at least one balancing element disposed at the circumference of at least one disk, the at least one balancing element being movable and fixable along the circumference of the at least one disk, the at least one balancing element displaying a functional shape, such as that used for cutting, mixing, conveying and/or emulsifying.

2. An assembly according to claim 1, wherein the balancing element displays a profile corresponding to the shape of a cutter blade.

3. An assembly according to claim 1, wherein the balancing element has the shape of a rectangle.

4. An assembly according to claim 1, wherein the balancing element has the shape of a triangle.

5. An assembly according to claim 1, wherein the balancing element has the shape of a rhombus.

6. An assembly according to claim 1, wherein the balancing element has the shape of a sawtooth.

7. An assembly according to claim 1, wherein the at least one disk includes a dovetail profile along its circumference, and the at least one balancing element includes a complementary dovetail profile, such that the balancing element can be movably attached to the disk by nesting the two dovetail profiles.

* * * * *